United States Patent [19]

Saito et al.

[11] Patent Number: 5,000,537
[45] Date of Patent: Mar. 19, 1991

[54] SLEEVE FOR AN OPTICAL FIBER CONNECTOR AND FABRICATING METHOD THEREFOR

[75] Inventors: Ken Saito, Kyoto; Koji Saito, Tokorozawa, both of Japan

[73] Assignees: Kabushiki Kaisha Nippon Optolonics Kenkyusho, Tokorozawa; Samko Senzai Kogyo Kabushiki Kaisha, Kyoto, both of Japan

[21] Appl. No.: 356,728

[22] Filed: May 25, 1989

[51] Int. Cl.⁵ .............................................. G02B 6/36
[52] U.S. Cl. .............................. 350/96.20; 350/96.21; 350/96.23
[58] Field of Search ............... 350/96.20, 96.21, 96.23; 29/DIG. 47

[56] References Cited

U.S. PATENT DOCUMENTS 4,330,171  5/1982  Malsot et al. ................ 350/96.20 X
4,830,456  5/1989  Kakii et al. ........................ 250/96.20
4,832,440  5/1989  Anderton ..................... 350/96.20 X Primary Examiner—William L. Sikes
Assistant Examiner—Dhan T. Heartney
Attorney, Agent, or Firm—Armstrong, Nikaido, Marmelstein, Kubovcik & Murray

[57] ABSTRACT

A sleeve for an optical fiber connector and fabricating method therefor for detachably connecting optical fibers mutually by gripping with an elastic restoring force plug ferrules at respective ends of optical fibers in a mutually matched state, the sleeve being made of resilient materials such as phosphor bronze, beryllium copper, high carbon steel and stainless steel, in a tubular form with an approximately C-shaped cross-section having a slit over its entire length, the ferrules being mutually inserted into both ends of the sleeve in an axial direction, wherein the slit is formed along the entire length of the sleeve and the tubular sleeve is formed by a process other than cutting or drilling.

6 Claims, 4 Drawing Sheets

Fig. I(a)
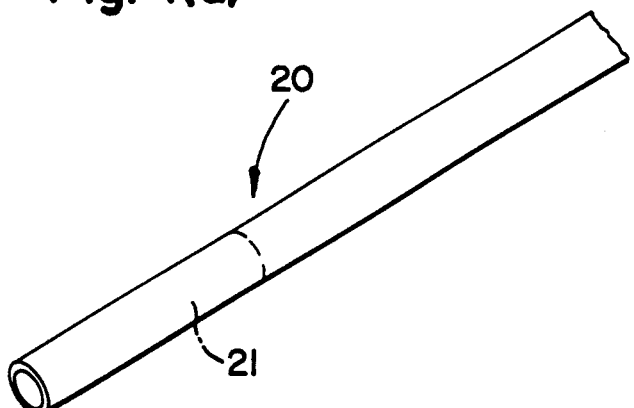
Fig. I(b)
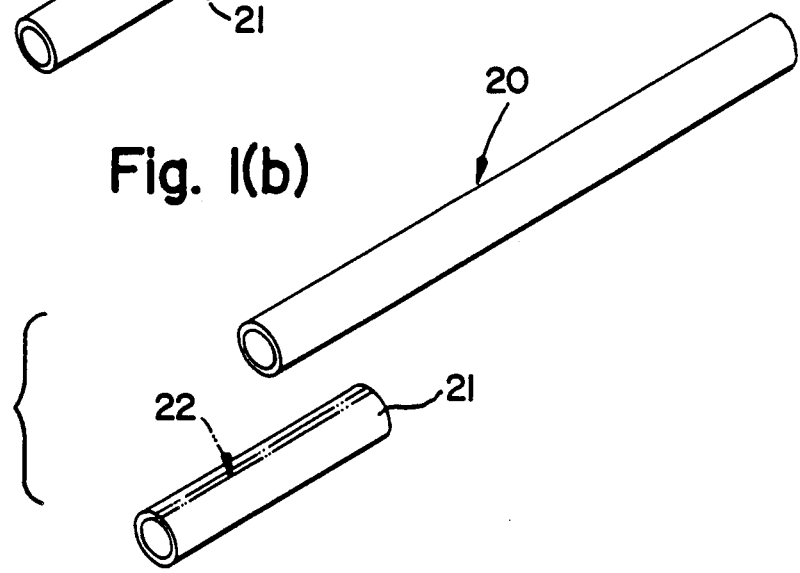
Fig. I(c)
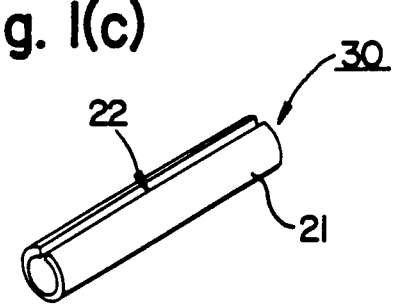

SLEEVE FOR AN OPTICAL FIBER CONNECTOR AND FABRICATING METHOD THEREFOR

BACKGROUND OF THE INVENTION

1. Field of the Invention

This invention relates to a sleeve for an optical fiber connector and a fabricating method therefor, for detachably connecting optical fibers mutually while holding them in a state in which ferrules coaxially formed at ends of the optical fibers are matched on a same axial line.

2. Background of the Invention

Optical fibers are used as optical wave guides for optical transmission of information by the medium of light.

The optical fiber, for example, an optical fiber 1 having a single core as shown in FIG. 3 is composed of a fiber core wire 4 comprising a core 2 and a cladding 3 differing in its refractive index from the core and made of high purity quartz glass or the like, and an outer covering 5 for coating said fiber core wire 4 being made of nylon, ultraviolet setting resin or the like.

The optical fiber 1 is manufactured in various lengths, and for constructing an optical fiber cable route, a plurality of optical fibers are semipermanently connected by fusion or adhesion to obtain an optical fiber cable length having a specified distance. However, when connecting the optical fiber 1 to an optical apparatus or when connecting the optical fibers 1 together at the time of construction, maintenance, experiment or other uses in an optical communication system, an easily detachable optical fiber connector is used.

Such an optical fiber connector is designed to connect the optical fibers 1 mutually by inserting plug ferrules 6 formed at the ends of respective optical fibers 1 into both ends of a sleeve 7 as shown in FIG. 4. The structure of the sleeve 7 is further described below.

The plug ferrule 6 is formed by laminating wear resistant materials such as synthetic resin, ceramics and metal properly to the end of the optical fiber 1, the plug ferrule 6 being coaxial with the fiber core 4 of the optical fiber 1. The sleeve 7 is a tubular member having an approximately C-shaped cross-section and having a slit 8 formed on the outer surface thereof running the entire length of the sleeve 7 in the axial direction thereof. The inside diameter of the sleeve 7 is slightly smaller than the outside diameter of the plug ferrule 6.

For mutual connection of optical fibers, it is enough to insert the plug ferrules 6, 6 formed at respect ends of the optical fibers 1, 1 into the sleeve 7 until they collide with each other. As a consequence, the sleeve 7 is slightly widened by the insertion of the plug ferrules 6, 6, therein and grips the outer surfaces of the plug ferrules 6, 6 by its own elastic restoring ability. At this time, the sleeve 7 and the plug ferrules 6, 6 are positioned coaxially, and therefore the fiber core 4, 4 of the optical fibers meet end to end, and are connected without any axial deviation, bending or folding.

To disconnect the optical fibers 1, 1, the plug ferrules 6, 6 are simply pulled out of the sleeve 7.

According to conventional practices, the sleeve 7 is manufactured in steps, as shown in FIGS. 6 (a) to (d). For example from one end of a phosphor bronze bar 9 measuring 3 mm in outside diameter and 1 m in length, a hole 10 measuring 2.5 mm in diameter having an effective depth of 10 mm or more coaxially along the axial direction is opened by cutting with a drill. This bar 9 is cut off, and a tubular member 11, 3 mm in outside diameter, 2.5 m in inside diameter, and 10 mm in length is fabricated, and a 0.5 mm wide slit 8 is formed along the entire length thereof in the axial direction along one side face of the tubular member 11.

However, the sleeve for an optical fiber connector manufactured according to the above method involved the following problems.

First, when repeated detachment and attachment of the plug ferrules 6, 6 inside the sleeve 7 is performed, material fatigue occurs as a result of repeated elastic deformation of the sleeve 7, and residual deformation in the diameter occurs, thereby permanently expanding the sleeve, and the gripping force on the plug ferrule 6 is consequently lowered. When the lowering of gripping force was measured by an experiment for checking the changes in the pulling load required when withdrawing the plug ferrule 6 from the sleeve 7 using a sleeve 7 made of phosphor bronze, after 100 repetitions of detaching and attaching the plug ferrule, the pulling load was lowered 60 to 70% from its initial value.

Such deformation of the sleeve 7 and consequent lowering of its gripping force may cause, when the optical fibers 1, 1 are connected, axial deviation as shown in FIG. 7, or increase of optical loss due to folding or bending as shown in FIG. 8, or the plug ferrule 6 may completely drop out of the sleeve 7.

Furthermore, such deformation may result in inspection or measurement errors during the inspection or measurement of equipment, when a particularly high frequency of detaching and attaching of the optical fibers is required. It has been desired to solve the problem of deformation of the connecting sleeve.

Accordingly, one attempt to solve the aforementioned problems could involve fabricating the sleeve 7 with a large gripping force in anticipation of the lowering of its gripping force over time. But in such a case, an enormous force is needed to initially detach and attach the plug ferrules 6, 6 and may also lead to accidental breakage of the optical fiber 1.

Furthermore, since the sleeve 7 is fabricated, as mentioned above, by repeatedly drilling, cutting and slotting the long bar 9, the manufacturing cost becomes extremely high.

SUMMARY OF THE INVENTION

To solve the above problems, it is hence a primary object of this invention to provide a sleeve for an optical fiber connector and fabricating method therefor, the sleeve being intended to detachably connect optical fibers mutually by gripping plug ferrules connected at the ends of the fibers in a mutually matched state with an elastic restoring force; the sleeve being made of resilient materials such as phosphor bronze, beryllium copper, high carbon steel and stainless steel, in a tubular form with an approximately C-shaped cross-section having a slit over its entire length; the ferrules being mutually inserted into the sleeve from both ends thereof in the axial direction, wherein the slit is formed in the sleeve along the entire length thereof and wherein the tubular material is formed by a process other than cutting or drilling.

According to the fabricating method of the sleeve for an optical fiber connector according to the present invention, multiple repetitions of detachment and attachment of the plug ferrules results in neither deformation nor lowering of the gripping force of the sleeve, and the sleeve for an optical fiber capable of securely detachably connecting in an accurately matched state the optical axes of adjacent optical fibers can be manufactured at a low cost.

BRIEF DESCRIPTION OF THE DRAWINGS

These and other objects of the invention, as well as the features and advantages thereof, will be better understood and appreciated from the following detailed description taken in conjunction with the drawings, in which:

FIGS. 1 (a) to (c) are drawings to show an embodiment of the fabricating method of a sleeve for an optical fiber connector of this invention, respectively showing a perspective view in each step of fabrication;

DETAILED DESCRIPTION OF THE INVENTION

Figure 2:
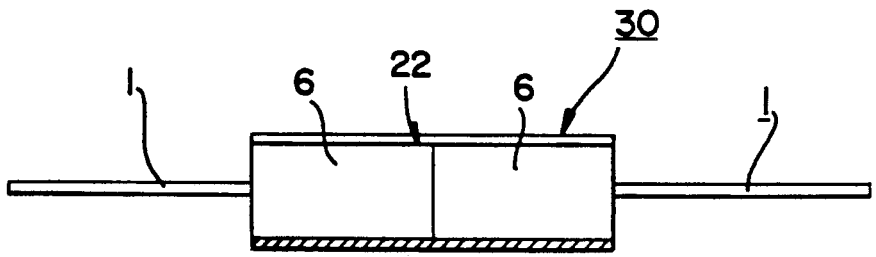
FIG. 2 is a longitudinal sectional view showing the connected state of plug ferrules by the sleeve manufactured by the same method of the invention.
Figure 3:
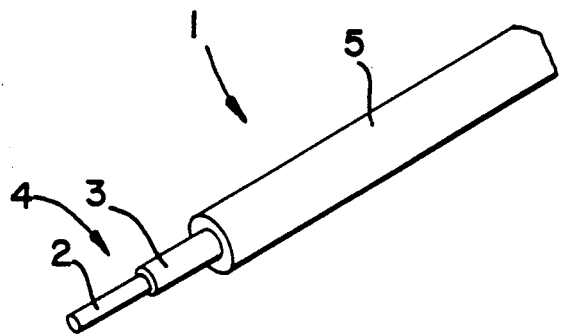
FIG. 3 is a perspective view showing an example of an optical fiber.
Figure 4:
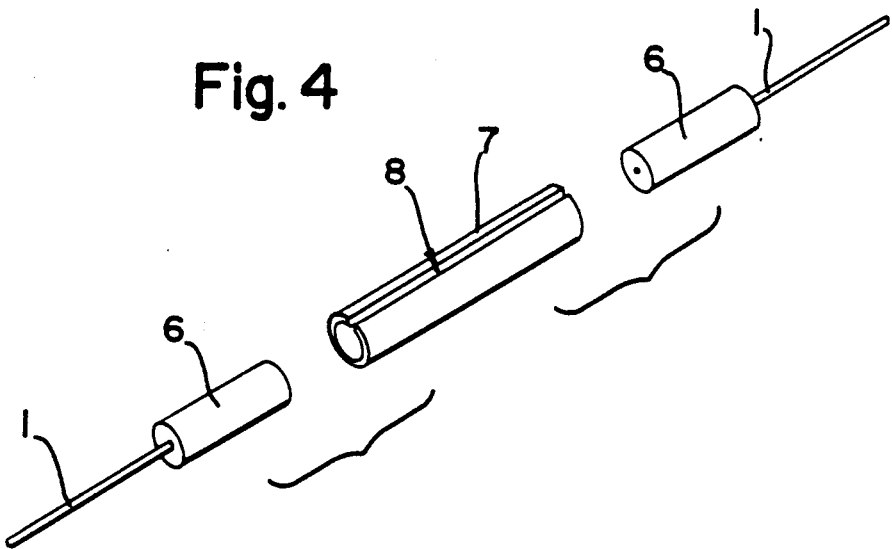
FIG. 4 is a perspective view showing a disconnected state of plug ferrules of optical fibers and the sleeve for an optical fiber connector.
Figure 5:
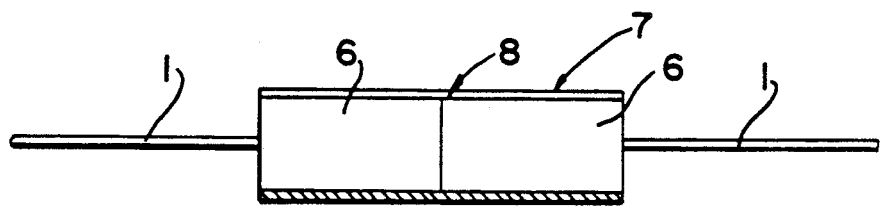
FIG. 5 is a longitudinal sectional view showing a connected state of the optical fibers by the same sleeve.
Figure 7:
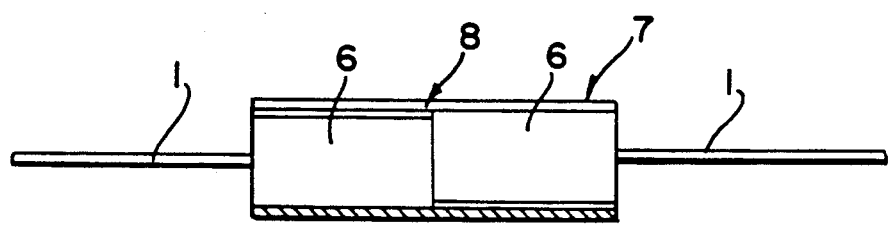
FIG. 7 and FIG. 8 are longitudinal sectional views illustrating the problems of the sleeve manufactured by the conventional method described in FIGS. 6(a) to (d).
Figure 8:
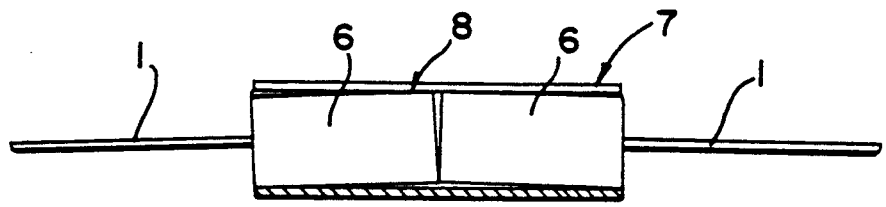
Figure 6A:
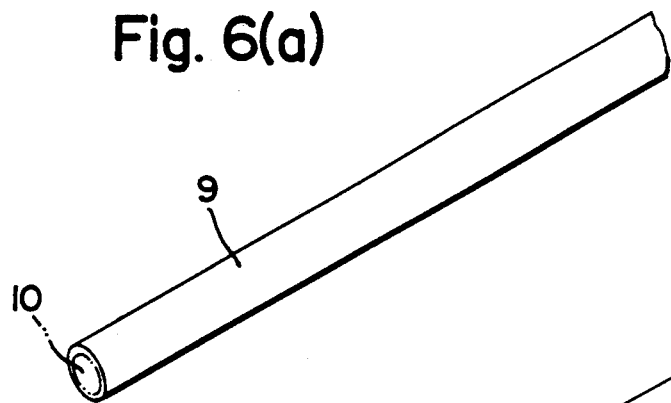
FIGS. 6 (a) to (d) are perspective views showing the manufacturing steps of the sleeve according to a conventional manufacturing method.
Figure 6B:
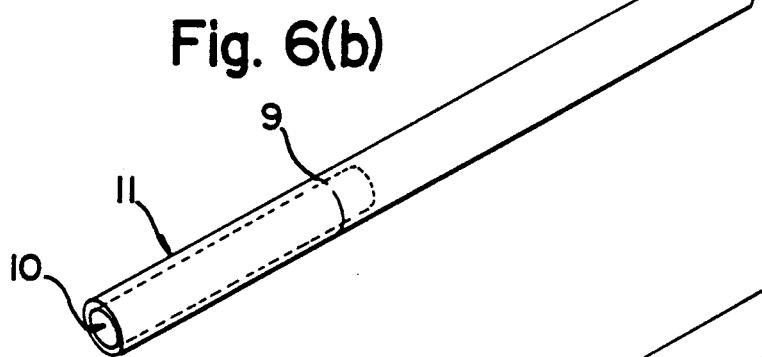
Figure 6C:
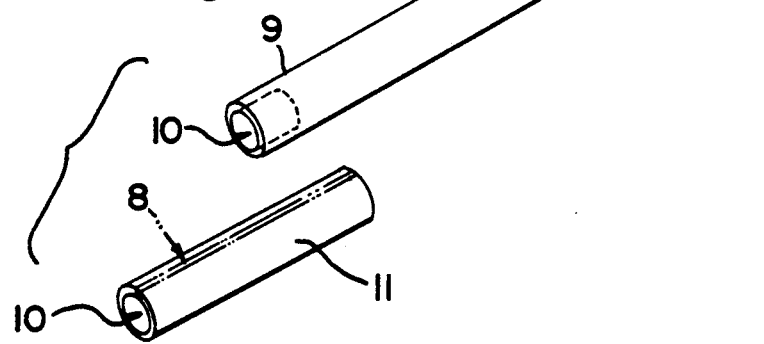
Figure 6D:
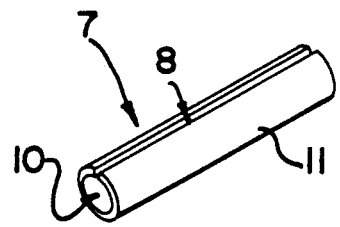

Referring now to FIGS. 1 (a) to (c), an embodiment of the manufacturing method of a sleeve for an optical fiber connector of the invention is described in detail below.

The manufacturing method of the present invention involves fabricating a sleeve 30 by forming a slit 22 in a tubular material 21 of a specified length cut off from a long tube 20.

Specifically, the tube 20 shown in FIG. 1 (a) measures 3 mm in outside diameter, 2.5 mm in inside diameter, and 1 m in length, and is pierced longitudinally therethrough by a process other than cutting or drilling. For example, the tube 20 may be formed by any of: drawing, extrusion, extraction and electric welding. More specifically, a heated billet is extruded by a die and core grid; or a large-diameter blank tube is formed by extraction, and this blank tube is reduced to a desired diameter by means of the die; or a core wire cladded with pipe material is reduced to a desired diameter by a die, and the core wire is removed by melting; or a hoop is formed longitudinally into a cylindrical shape, and the junction is welded and the tube thus formed is reduced to a desired diameter by a die. The material of this tube 20 is a resilient material, such as phosphor bronze, beryllium copper, high carbon steel and stainless steel.

The tube 20 is cut every 10 mm in the axial direction thereto as shown in FIG. 1 (b) to form a tubular section 10 mm long, and having a 0.5 mm wide slit 22 formed along the entire length thereof in the axial direction, as shown in FIG. 1 (c), along a side face of the tubular section 21, thereby obtaining a desired sleeve 30.

Thus, the sleeve 30 fabricated according to the method 10 of the present invention, when repeatedly detached and attached to the plug ferrules 6 a multiple number of times, remains free from deformation or lowering of its gripping force due to material fatigue, as compared with the sleeve 7 manufactured according to conventional methods. That is, the sleeve 30 manufactured by the method of the present invention is outstandingly enhanced in its fatigue limit as compared with the sleeve 7 manufactured by the conventional method, and consequently changes in the gripping strength of the sleeve due to aging are drastically decreased. As a result of the same experiment, as stated above, for checking changes in the pulling load required for withdrawing the plug ferrules 6 from the sleeve 30 made of phosphor bronze, not only after 100 repetitions of detaching and attaching of the plug ferrule 6, but also even after 2,000 times, there was no change detected from the initial value of the pulling load required to remove the ferrules, and after 2,000 repetitions of detaching and attaching, there was no change in the shape of the sleeve from that shown in FIG. 2.

There are several reasons to explain the enhancement of fatigue limit and the drastic decrease of changes due to aging in the sleeve of the present invention, among them: microscopic surface properties of the inner surface of the sleeve 30, uniform arrangement of metal texture, and thermal effects. More specifically, according to the fabricating method of the invention, since the sleeve 30 is manufactured from a tube 20 pierced therethrough by a process other than cutting or drilling, the inner surface of the sleeve 30 remains free from effects of surface roughness derived from hairline machining marks along the circumferential direction caused by drilling when machining the hole therethrough, or effects due to heat microscopically generated between the drill and the material when machining a hole therethrough, as experienced in the prior art. Furthermore, the effects of crystal structure may also be considered as explanations for the improved properties of the sleeve according to the present invention.

As described herein, according to the fabrication method of a sleeve for an optical fiber connector according to the present invention, since there are hardly any deformations due to fatigue or lowering of the gripping force on the plug ferrules by multiple repetitions of detaching and attaching of plug ferrules, the optical fibers can be connected securely and for a long period of time, thus precisely matching the optical axes of the fibers without any risk of axial deviation or breakage; and hence, optical loss at the connection may be maintained at a minimum level over a long period of time. The processing of the sleeve is also easier than in the prior art, and productivity is high, so that the sleeve for an optical fiber connector may be realized at a lower cost.

What is claimed is:

1. A process for fabricating a sleeve for an optical fiber connector for mutually detachably connecting optical fibers by gripping plug ferrules formed at respective ends of said optical fibers with an elastic restoring force, said ferrules being in a mutually matched abutting state, comprising the steps of:

selecting a resilient metal material;
   forming said resilient material into a tubular shape, thereby forming a metal tube having an outer diameter and an elongate hole therethrough defining an inner diameter, wherein said hole is formed by a process other than cutting or drilling;

cutting said tube in an axial direction to form a plurality of tubular sections;

forming a longitudinal slit along an entire length of said tubular sections so that said sections are approximately C-shaped in cross-section having said slit over the entire length thereof.

2. A process for fabricating a sleeve for an optical fiber connector for mutually detachably connecting optical fibers by gripping plug ferrules formed at respective ends of said optical fibers with an elastic restoring force, said ferrules being in a mutually matched abutting state, comprising the steps of:

selecting a resilient metal material;

forming said resilient material into a tubular shape, thereby forming a metal tube having an outer diameter and an elongate hole therethrough defining an inner diameter, wherein said hole is formed by a process other than cutting or drilling;

forming a longitudinal slit along an entire length of said metal tube so that said tube is approximately C-shaped in cross-section having said slit over the entire length thereof.

cutting said tube in an axial direction to form a plurality of tubular sections.

3. A process for fabricating a sleeve for an optical fiber according to claim 1, wherein said resilient material is selected from one of phosphor bronze, beryllium copper, high carbon steel and stainless steel.

4. A process for fabricating a sleeve for an optical fiber according to claim 2, wherein said resilient material is selected from one of phosphor bronze, beryllium copper, high carbon steel and stainless steel.

5. A sleeve for an optical fiber connector made according to the process of claim 1.

6. A sleeve for an optical fiber connector made according to the process of claim 2.

* * * * *

UNITED STATES PATENT AND TRADEMARK OFFICE
CERTIFICATE OF CORRECTION

PATENT NO. : 5,000,537

DATED : March 19, 1991

INVENTOR(S) : SAITO et al

It is certified that error appears in the above-identified patent and that said Letters Patent is hereby corrected as shown below:

On the cover page, item [73], "Samko", should read -- Sanko --.

Signed and Sealed this

Tenth Day of November, 1992

Attest:

DOUGLAS B. COMER

*Attesting Officer*     Acting Commissioner of Patents and Trademarks